United States Patent [19]

Latino et al.

[11] 4,344,205
[45] Aug. 17, 1982

[54] CABLE BUSHING

[75] Inventors: Richard M. Latino, Worcester; Edmund T. Paquette, Shrewsbury, both of Mass.

[73] Assignee: Wright Line Inc., Worcester, Mass.

[21] Appl. No.: 139,286

[22] Filed: Apr. 11, 1980

[51] Int. Cl.³ .............................................. F16L 5/00
[52] U.S. Cl. .................................... 16/2; 174/153 G; 248/56; 403/197
[58] Field of Search ............ 174/65 G, 152 G, 153 G; 339/101, 103 B; 248/56; 16/2; 403/197, 195, 41

[56] References Cited

U.S. PATENT DOCUMENTS

| | | | |
|---|---|---|---|
| 3,493,205 | 2/1970 | Bromberg | 248/56 |
| 3,516,111 | 6/1970 | Heyman | 16/2 |
| 3,751,579 | 8/1973 | Nojiri | 248/56 X |
| 4,000,875 | 1/1977 | Jemison et al. | 174/153 G X |
| 4,056,252 | 11/1977 | Simon | 174/153 G X |
| 4,190,222 | 2/1980 | Appleton et al. | 174/65 G X |

Primary Examiner—Andrew V. Kundrat
Attorney, Agent, or Firm—Milton E. Gilbert; Gary E. Ross

[57] ABSTRACT

A cable bushing including a frame portion, and a filler portion connected to the frame portion, the filler portion being movable between a first position in which the filler portion is remote from the interior of the frame portion and a second position in which the filler portion is disposed substantially within the frame portion, the frame portion being adapted to occupy an opening in a partition structure and being further adapted to receive a cable therethrough.

11 Claims, 5 Drawing Figures

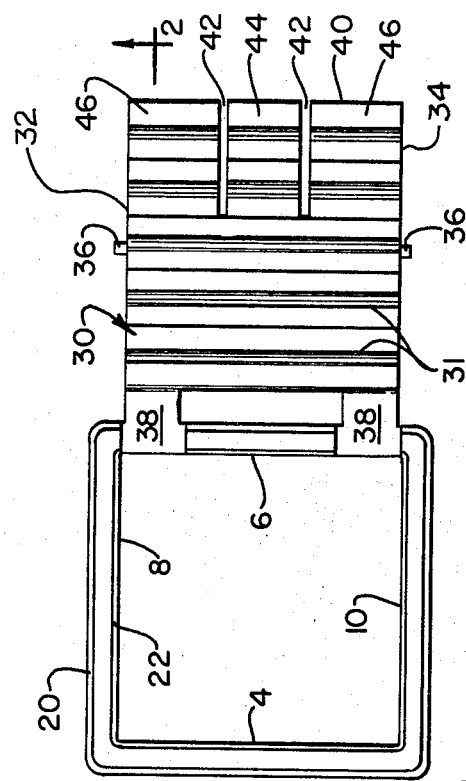
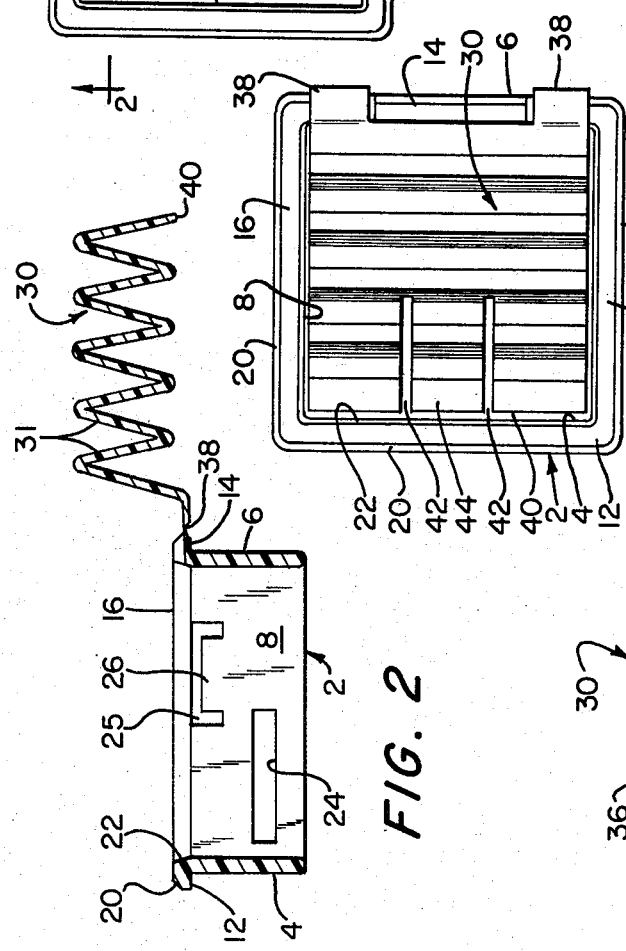
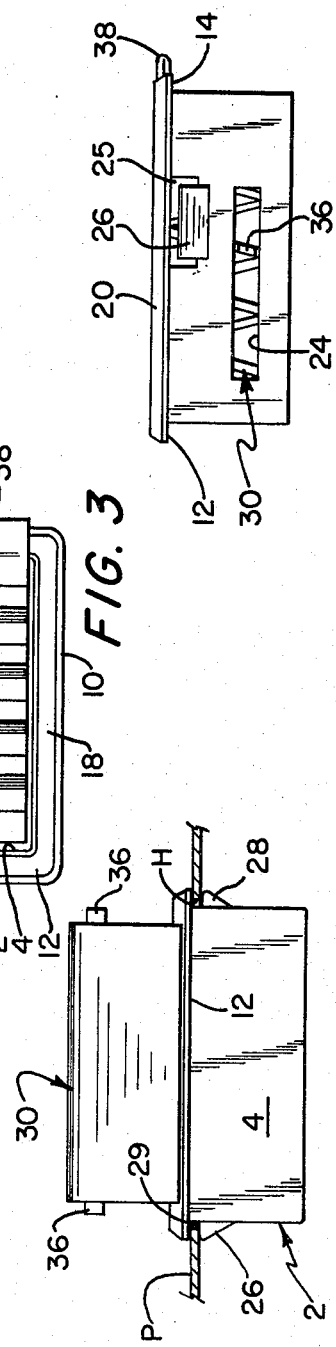

CABLE BUSHING

BACKGROUND OF THE INVENTION

1. Field of the Invention

The invention relates to cable fixtures and is directed more particularly to a cable bushing for supporting a cable member passing through a partition structure.

2. Description of the Prior Art

It is commonplace, in order to pass an electrical cable through a partition or wall, to cut a hole in the partition and pass the cable therethrough. In many instances, however, the partition is of metal and such a hole presents sharp edges which tend to cut and/or wear away the outer layers of the cable. To prevent damage to the cable, there have been provided cable bushings which, however, have required cutting with a sharp instrument to allow passage of a cable therethrough.

SUMMARY OF THE INVENTION

An object of the present invention is to provide a cable bushing adapted to occupy an opening in a wall structure and to receive a cable therethrough.

A further object of the invention is to provide a cable bushing adapted for use without cutting of the device.

A still further object of the invention is to provide a cable bushing as above described and having facility for filling at least a portion of the space between the cable and the surrounding bushing.

With the above and other objects in view, as will hereinafter appear, a feature of the present invention is the provision of a cable bushing including a frame portion, and a filler portion connected to the frame portion, the filler portion being movable between a first position in which the filler portion is remote from the interior of the frame portion and a second position in which the filler portion is disposed substantially within the frame portion, the frame portion being adapted to occupy an opening in a partition structure and being further adapted to receive a cable therethrough.

The above and other features of the invention, including various novel details of contruction and combination of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

In the drawings:

FIG. 1 is a top plan view of a cable bushing illustrative of an embodiment of the invention;

FIG. 2 is a sectional view taken along line II—II of FIG. 1;

FIG. 3 is a top plan view, similar to FIG. 1, but showing parts of the bushing in alternative positions;

FIG. 4 is a side elevational view with parts of the bushing in the same positions as in FIG. 3; and FIG. 5 is a front elevational view with parts of the bushing in the same positions as in FIGS. 1 and 2, the bushing being shown in place in a wall structure.

DESCRIPTION OF THE PREFERRED EMBODIMENT

Referring to the drawings, it will be seen that the illustrative cable bushing includes a frame portion 2 having a front wall 4 and a back wall 6 interconnected by side walls 8, 10. Each of the walls 4, 6, 8, 10 is provided with a flange portion 12, 14, 16, 18, respectively, along one edge thereof, the flange portions extending outwardly from the walls 4, 6, 8, 10. Each of the flange portions is provided with bevelled surfaces 20, 22, best seen in FIG. 2.

Each of the side walls 8, 10 is provided with an elongated slot 24, the slots 24 being parallel and opposed. Each of the side walls 8 and 10 is provided with a U-shaped slot 25 which demarcates three sides of a tab 26. The outer side of each tab 26 projects from the remainder of the associated side wall 8 or 10 and is characterized by a surface 28 inclined from the walls 8 or 10 and a second surface 29 generally normal to that wall. Each tab can be flexed relative to the remainder of the associated side wall 8 or 10.

Referring to FIG. 5, it will be seen that the flange portions 16, 18 and the tabs 26 are intended to engage opposite sides of a wall or partition P to secure the bushing in a hole H in the wall or partition. Connected to the frame portion 2 is a filler portion 30 which is formed so as to be zig-zag configuration and able to compress and expand accordian-fashion. Preferably, the filler portion 30 is pivotally mounted on the frame portion 2 for movement between a first position in which the filler portion 30 is remote from the interior of the frame portion 2 (FIGS. 1, 2 and 5) and a second position in which the filler portion is disposed substantially within the frame portion (FIGS. 3 and 4) and serves as a louver or closure in the manner hereinafter described.

On each side edge 32, 34 of the filler portion 30 there are disposed a pair of projections 36 which are adapted to be received by the slots 24 and to slide in the slots 24 responsive to compression and expansion of the filler portion 30.

It is preferred that the bushing be of molded plastic onepiece construction and include "living hinge" portions 38 interconnecting the frame and filler portions 2, 30. The hinge portions 38 permit the filler portion to be moved between the first and second positions described above. The hinge portions may be formed with a groove on one side to enable them to flex and bend more readily so as to facilitate movement of the filler portion from its first position into its second position as described above. The plastic used is a thermoplastic material which is relatively stiff yet sufficiently resilient to bend under pressure and return to its orginal formed shape when the pressure is removed. By way of example, the bushing may be molded of polypropylene.

Preferably, the filler portion has, extending from its front edge 40, a pair of slits 42 defining a central filler section 44 flanked by two side filler sections 46. The central filler section 44 and the side filler sections 46 are movably operable independently of each other.

In use, the filler portion 30 is moved about the hinge portions 38 until the filler portion is substantially within the frame portion 2 (FIGS. 3 and 4). The filler portion is plastically deformed by engagement of projections 36 with the side walls 8, 10 until the projections reach the slots 24, at which time the projections 36 snap into the slots 24 and the filler portion is relieved from deformation (alternatively or additionally the side walls 8 and 10 may deform as required to allow projections 36 to snap into slots 24).

The bushing is then inserted in a hole of suitable size and shape, e.g., a 2.2 inch by 2.2 inch square hole, in a partition P of sheet metal, or the like. The wall portions 4, 6, 8, 10 are slid into the hole until the inclined surfaces 28 of the tabs 26 encounter the partition. Additional pressure applied to the bushing causes the tab portions of wall 8, 10 to deform slightly so as to allow tab surfaces 28 to ride past the edges of the hole, snapping into place upon reaching the other side of the partition, as seen in FIG. 5. At this point, the flange portions 12, 14, 16, 18 are snugly adjacent one side of the partition, and the tab surfaces 29 snugly against the other side. The distance between the flange portions 16, 18 and the tab surfaces 29 is generally equal to the thickness of the partition P to securely retain the bushing in the partition hole.

The filler portion 30 is formed so that when it is in its second position it extends substantially for the full distance between side walls 4 and 6 and also between side walls 8 and 10. However, since it is resilient and is formed so as to have an accordian shape, it may be compressed so that its folds 31 come closer together and thus provide an opening in the frame portion 2 between side wall 4 and the front edge 40 through which a cable (not shown) may be passed. The filler portion 30 will tend to hold its front edge 40 against the cable so long as the filler portion is not compressed by an exterior force. Electric cords may be passed through an opening defined by compressing and moving only the central filler sections 44. Somewhat larger cords and small cables may be accommodated by the central filler portion and one of the side filler sections 46. In the case of larger cables, the central filler section and both of the side filler sections abut peripheral portions of the cable.

Thus, the walls 4, 6, 8, 10 of the bushing protect the cable or cord from cutting and chafing actions of the partition hole edge. Further, the filler portion 30 to a large extent fills the space between the cable and the bushing, impeding flow of dust through the partition P. The bevelled surfaces 22 permit the cable to lie free of sharp edges.

It is to be understood that the present invention is by no means limited to the particular construction herein disclosed and/or shown in the drawings, but also comprises any modifications or equivalents within the scope of the disclosure. For example, the filler portion 30 may be of other materials and/or configurations affording compressibility and may be attached by means other than pivotal, as by slide rails and tracks. Further, while in the preferred embodiment the filler portion is pivoted to a position within the frame portion, it will be apparent that the filler portion might be pivoted to a position in which it covers an edge of the frame portion. In the latter instance, the function of the slots 24 would be assumed by structure on the exterior of the frame portion.

Having thus described our invention, what we claim as new and desire to secure by Letters Patent of the United States is:

1. A cable bushing comprising a frame portion, and a filler portion connected to said frame portion, said filler portion being pivotally movable between a first position in which said filler portion is remote from the interior of said frame portion and a second position in which said filler portion is disposed substantially within said frame portion, said frame portion being adapted to occupy an opening in a partition structure and being further adapted to receive a cable therethrough, said filler portion while in said second position being extendable to substantially close said frame portion, and being compressible so as to form an opening between it and the frame portion so as to permit the cable to be received therethrough.

2. The invention in accordance with claim 1 in which said filler portion is pivotally connected to said frame portion.

3. The invention in accordance with claim 1 in which said bushing is a molded plastic one-piece unit, said unit including a hinge portion by which said filler portion and said frame portion are interconnected.

4. The invention in accordance with claim 2 or 3 in which said frame portion includes four walls, and said filler portion extends from a first of said walls and comprises a plurality of folds connected in an accordian fashion and adapted for disposition within said walls.

5. The invention in accordance with claim 4 in which an opposed pair of said walls extending from said first wall are provided with parallel slots therein, and said filler portion is provided with projections extending outwardly from either side thereof, said slots being adapted to receive said projections, said projections being slidingly movable in said slots in accordance with compression and extension of said accordian filler portion.

6. The invention in accordance with claim 5 in which said filler portion is engageable with said cable.

7. The invention in accordance with claim 6 in which an edge of said filler portion most remote from said first wall has a pair of slits therin normal to said edge, said slits defining a central filler portion flanked by two side filler portions, each of said central and side filler portions being movable in compression and extension independently of each other.

8. The invention in accordance with claim 4 in which a portion of said walls are provided with means for securing said frame portion in said partition structure opening.

9. The invention in accordance with claim 8 in which said securing means comprises integrally molded tabs extending outwardly from said walls portion.

10. The invention in accordance with claim 9 including flange means extending outwardly from said frame portion and spaced from said tabs by a distance generally equal to the thickness of said partition structure.

11. A cable bushing comprising a frame portion having four walls, and a filler portion connected to a first of said walls, said filler portion being movable between a first position in which said filler portion is removed from the remainder of said walls and a second position in which said filler portion is in contact with at least two of said remainder of said walls, said filler portion thereby at least partially covering a space defined by said frame portion, said frame portion being adapted to occupy an opening in a partition structure and being further adapted to receive a cable therethrough said frame portion having a plurality of connected folds disposed in a zigzag configuration so as to permit the sliding movement of said filler portion while in its second position by the compression or extension of said filler portion in an accordian fashion.

* * * * *